US011900678B2

(12) United States Patent
Hall et al.

(10) Patent No.: US 11,900,678 B2
(45) Date of Patent: Feb. 13, 2024

(54) SYSTEM FOR TRACKING, LOCATING AND CALCULATING THE POSITION OF AN OBJECT IN A GAME INVOLVING MOVING OBJECTS

(71) Applicants: Patricia Hall, Long Beach, CA (US); Matthew Hall, Long Beach, CA (US); Jonathan Hall, Long Beach, CA (US); Joseph Hall, Long Beach, CA (US)

(72) Inventors: Patricia Hall, Long Beach, CA (US); Matthew Hall, Long Beach, CA (US); Jonathan Hall, Long Beach, CA (US); Joseph Hall, Long Beach, CA (US)

(*) Notice: Subject to any disclaimer, the term of this patent is extended or adjusted under 35 U.S.C. 154(b) by 0 days.

(21) Appl. No.: 18/213,821

(22) Filed: Jun. 24, 2023

(65) Prior Publication Data

US 2023/0410507 A1 Dec. 21, 2023

Related U.S. Application Data

(63) Continuation-in-part of application No. 18/104,113, filed on Jan. 31, 2023, now Pat. No. 11,707,663, which is a continuation-in-part of application No. 17/834,980, filed on Jun. 8, 2022, now Pat. No. 11,565,166.

(60) Provisional application No. 63/208,029, filed on Jun. 8, 2021.

(51) Int. Cl.
*G06V 20/40* (2022.01)
*G06T 7/292* (2017.01)

(52) U.S. Cl.
CPC .............. *G06V 20/42* (2022.01); *G06T 7/292* (2017.01); *G06T 2207/30224* (2013.01); *G06T 2207/30241* (2013.01)

(58) Field of Classification Search
CPC .................. G06V 20/42; G06V 10/764; G06T 2207/30241; G06T 7/292; G06T 7/251; G06T 2207/10016; G06T 2207/30201; G06T 2207/30224; A63B 71/0605; A63B 2102/18; A63B 2220/05; A63B 2220/806
See application file for complete search history.

(56) References Cited

U.S. PATENT DOCUMENTS

| | | | | |
|---|---|---|---|---|
| 4,915,384 A | * | 4/1990 | Bear ................... | A63B 69/3614 473/154 |
| 6,377,296 B1 | * | 4/2002 | Zlatsin ...................... | G06T 7/20 707/E17.026 |
| 6,503,086 B1 | * | 1/2003 | Golubov ............ | A63B 24/0003 463/7 |
| 8,014,565 B2 | * | 9/2011 | Gordon ................ | G06V 40/166 348/169 |
| 8,636,603 B2 | * | 1/2014 | Rauchholz ............. | A63B 53/14 473/409 |
| 8,834,303 B2 | * | 9/2014 | Jennings ................ | A63C 19/00 473/415 |
| 9,563,955 B1 | * | 2/2017 | Kamarshi ............ | G01B 11/026 |
| 10,467,478 B2 | * | 11/2019 | Chen ......................... | G06T 7/70 |
| 10,523,864 B2 | * | 12/2019 | Harrison ................ | G06V 10/56 |
| 10,600,334 B1 | * | 3/2020 | Zhang .................. | A61B 5/1128 |
| 10,737,167 B2 | * | 8/2020 | Greiner ............. | A63B 71/0616 |

(Continued)

*Primary Examiner* — Manav Seth
(74) *Attorney, Agent, or Firm* — Adam Warwick Bell

(57) ABSTRACT

A system for detecting, capturing, analyzing and displaying data for a game using a moving ball and players, whereby the system defines, stores and displays various characteristics of the ball in real time.

20 Claims, 8 Drawing Sheets

(56) References Cited

U.S. PATENT DOCUMENTS

| | | | |
|---|---|---|---|
| 11,348,256 B2* | 5/2022 | Perry | H04N 23/80 |
| 11,565,166 B2* | 1/2023 | Hall | A63B 71/0622 |
| 2005/0196737 A1* | 9/2005 | Mann | A63B 24/0003 |
| | | | 434/247 |
| 2021/0125349 A1* | 4/2021 | Song | G01S 5/16 |
| 2021/0319618 A1* | 10/2021 | Lee | H04N 13/117 |
| 2021/0322850 A1* | 10/2021 | Hermandorfer | A63F 13/53 |
| 2023/0040575 A1* | 2/2023 | Ungstrup | G06V 40/10 |

* cited by examiner

SYSTEM FOR TRACKING, LOCATING AND CALCULATING THE POSITION OF AN OBJECT IN A GAME INVOLVING MOVING OBJECTS

RELATIONSHIP TO OTHER APPLICATIONS

This patent application is a continuation-in-part of U.S. application Ser. No. 18/104,113 filed 31 Jan. 2023, which is a continuation-in-part of U.S. application Ser. No. 17/834,980 (U.S. Pat. No. 11,565,166), filed 8 Jun. 2022, which itself is a non-provisional of US provisional application No. 63/208,029, filed 8 Jun. 2022, and this patent application also claims priority to and the benefit of US provisional application No. 63/395,692, filed 5 Aug. 2022, all of which are incorporated by reference in their entirety.

BACKGROUND

Games involving moving objects such as balls are ubiquitous. The balls (or pucks, shuttlecocks or other objects) may move in 3 dimensions, such as in cricket, basketball, baseball, football, hockey, soccer, rugby, golf, tennis, badminton, volleyball etc, or on a 2-dimensional surface such as snooker, pool, curling, boules, bowls etc. Tracking of the ball and integrated high-speed image analysis allows automated real-time determination and reporting of fouls and other point-determining game data. To date, this has been possible only with cumbersome and expensive camera-software systems, making them cost-prohibitive to non-professional teams such as little-league teams and the like.

The present invention may address various applications for such games. All these games include the potential for fouls or penalties depending on the location of the ball and/or one or more players at a particular point in time, and the invention may be employed to determine if a penalty situation is present at a given time.

Additionally, the invention may provide a virtual environment in which a game may be played using full virtual reality or mixed reality.

For example, in a baseball game, the innovation may provide a computerized system for automatic classification of a 'strike' or a 'ball' or a 'hit' or a foul etc., in reference to a baseball that is pitched by a pitcher in a game of baseball on a baseball field having a home plate, a pitcher's mound, a first base, a second base, and a third base, the system comprising at least 2 cameras, positioned appropriately, both in functional communication with a computer programmed with software running an AI-based object detection algorithm that monitors and analyses the video images comprising at least a Human Pose Estimation engine and a Strike Prediction Engine running a trained AI system, wherein the computer (i) uses Human Pose Estimation to ascribe anatomical or physical coordinates such as facial and skeletal coordinates to the batter, (ii) ascribes coordinates to stationary elements such as a home plate, a baseball mitt, and a baseball bat, if present in the frame, and (iii) integrates information about the coordinates of the batter and the coordinates of the home plate to define a real-time virtual three-dimensional volume (the strike zone), and further (iv) identifies the ball in motion, continuously collects data about the location and speed of the ball, and provides this data to the Strike Prediction Engine, wherein the data is transformed and analyzed to produce an output defining the pitch as a strike, a ball or a hit.

BRIEF DESCRIPTION OF THE INVENTION

The invention encompasses a system for tracking, locating and calculating the position of an object in a game involving moving objects. More specifically, the invention encompasses a system for detecting, capturing, analyzing and displaying data for a game using a moving ball and players, whereby the system defines, stores and displays various characteristics of the ball in real time.

In this disclosure, we describe a system that integrates ball-tracking and integrated high-speed image analysis allows automated real-time determination and reporting of fouls and other point-determining game data. Importantly the system of the invention is neither cumbersome nor expensive, making it easily available to little-league teams and the like.

The present invention encompasses a ball tracking system that can determine if a penalty or fowl is present at a given time in a given game, and is adaptable to many games involving balls or other moving objects. Additionally the system of the invention can determine various characteristics of a moving ball such as "pitch type", for example a fast-ball, slow-ball or curve-ball. Other embodiments involve the real time collection and display of data for training purposes. Various embodiments are discussed, with some of the most recent embodiments for the continuation-in-part described at the latter part of this disclosure.

The basic exemplary embodiment relates to an automated baseball ball/strike identification system that can replace the human umpire's judgement during baseball games. Here, a combination of one or more cameras positioned in a specific combination and location, integrates with an intelligent (AI/ML) computing systems. This is a real-time and predictive system that can detect multiple moving objects in the game of baseball and will make accurate decisions even if the umpire is not present physically. Note that both the ball and the players will be moving, and the system needs to monitor both to determine and to predict the RELATIVE POSITION of a ball with respect to a batter at a specific moment in time. The goal is to develop a very affordable and accurate system to reduce the cost of automated systems, and to reduce reliance on human discretion to allow balls and strikes to be accurately called. The system is designed to be accurate, flexible, easily installable and implementable and economically attractive (i.e., affordable); all of which are important features very much in contrast with current systems.

DETAILED DESCRIPTION OF THE INVENTION

Figure 1:
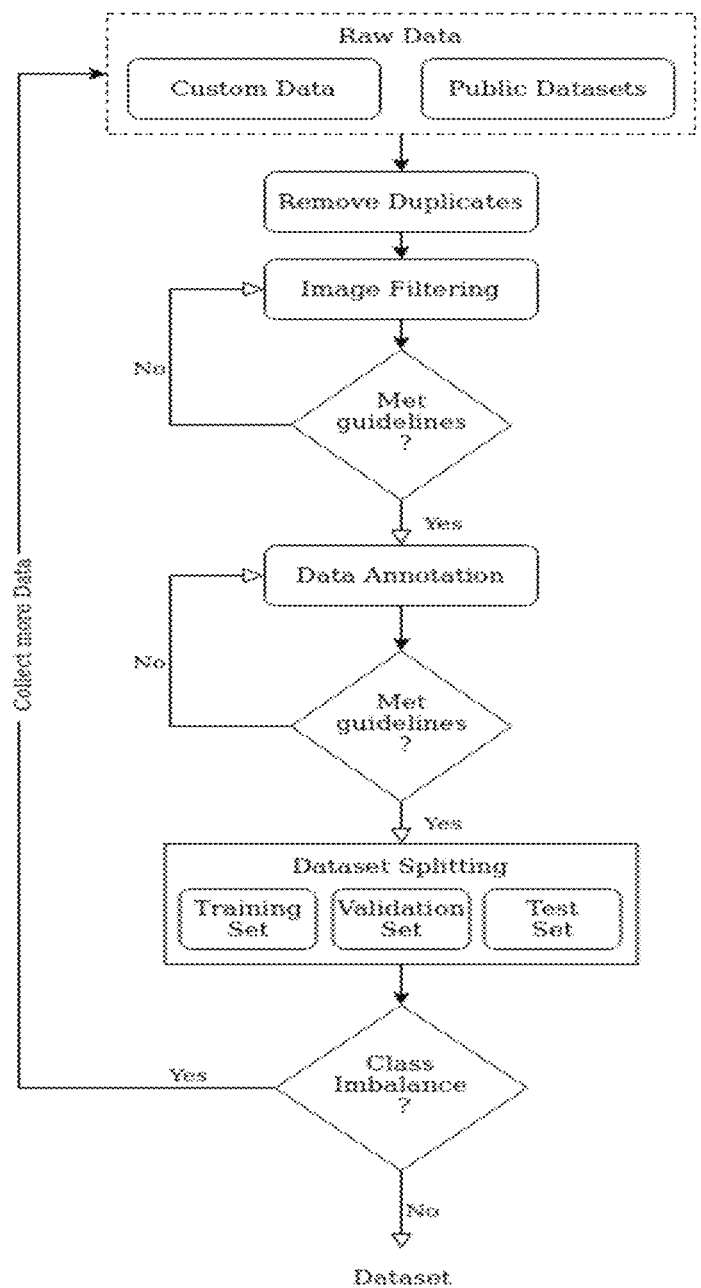
FIG. 1 shows Dataset Curation and is a schematic diagram depicting the steps of building and curating the dataset used for training the ML models.

The invention provides a system for tracking, locating and calculating the position of an object in a game involving moving objects, and more specifically encompasses methods, devices and systems for detecting, capturing, analyzing and displaying data for a game using a moving ball and players, whereby the system defines, stores and displays various characteristics of the ball in real time.

General Disclosures, Terminology and Definitions

This specification incorporates by reference all documents referred to herein and all documents filed concurrently with this specification or filed previously in connection with this application, including but not limited to such documents which are open to public inspection with this specification. All numerical quantities mentioned herein include quantities that may be plus or minus 20% of the stated amount in every case, including where percentages are mentioned. As used in this specification, the singular forms "a, an", and "the" include plural reference unless the context clearly dictates otherwise. Thus, for example, a reference to "a part" includes a plurality of such parts, and so forth. The term "comprises" and grammatical equivalents thereof are used in this specification to mean that, in addition to the features specifically identified, other features are optionally present. For example, a composition "comprising" (or "which comprises") ingredients A, B and C can contain only ingredients A, B and C, or can contain not only ingredients A, B and C but also one or more other ingredients. The term "consisting essentially of" and grammatical equivalents thereof is used herein to mean that, in addition to the features specifically identified, other features may be present which do not materially alter the claimed invention.

The term "at least" followed by a number is used herein to denote the start of a range beginning with that number (which may be a range having an upper limit or no upper limit, depending on the variable being defined). For example, "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Where reference is made in this specification to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps (except where the context excludes that possibility). When, in this specification, a range is given as "(a first number) to (a second number)" or "(a first number)-(a second number)", this means a range whose lower limit is the first number and whose upper limit is the second number. For example, "from 40 to 70 s" or "40-70 s" means a range whose lower limit is 40 s, and whose upper limit is 70 s.

In this disclosure, when talking about the baseball application of the invention, we discuss various positions on the field. When we refer to a position 'behind' home base (home plate), we are referring to a position that would be behind the batter when the batter is on home base and facing the pitcher. When we refer to a primary camera (number 2 in FIG. 7a) in a position 'behind and above the catcher' we mean a position that is behind home base (home plate), as already described, and elevated about the ground by at least 6 ft., up to any appropriate height suitable for the cameras function. When we talk about a side camera ('a secondary camera", numbers 3 and 4 in FIG. 7a) being positioned to the left (or right) of the home base (home plate), we are referring to a position that is to the left (arbitrarily) of the home base, approximately along a line orthogonal to a line drawn between the home plate and second base. The side cameras are usually positioned outside of the field boundary, and at least 20 or 30 ft from the home base. Exemplary positions are reasonably accurately shown in FIG. 7a.

Artificial Intelligence (AI) encompasses any computerized system of analysis whereby input data is processed using an analytical algorithm trained on a large data set wherein the system is capable of improving accuracy of output data over time using further training. Machine learning (ML) relates to computerized methods that leverage data to improve computer performance on some set of tasks. ML algorithms build a model based on training data, in order to make predictions or decisions without being explicitly programmed to do so.

Breadth of Application of the Invention

It should be noted that although the present disclosure relates to baseball, the invention may be used with and applied to any number of ball games all of which inherently encompass problems of calling a good or a foul ball depending on the location of the ball at a certain time in relation to a fixed or a variable/moving point such as an inanimate object (plate, diamond, wicket, court markings etc), or such as the body and anatomy of a player, for example a batter. Other applications readily suggest themselves. The invention may be adapted (given appropriate modifications such as the frame rate of the camera) to track the position of and predict the ultimate point of impact of any object moving in two or three dimensions, having a predictable path of transit and not capable of making autonomous changes of direction, such as a projectile, missile, warhead or shell.

It should be noted that the inventors have already developed and patented a ball tracking system for golf applications (U.S. Pat. No. 11,565,166). The present disclosure applies this previously-filed technology to baseball, cricket and related games, with specific variations required to meet the very particular rule requirements of these games, particularly the positioning of cameras and the programming of the controlling and analytical algorithms that track and locate (or predict the location of) a ball at a specific point in time in relation to various anatomical features of the players. A substantial amount of the disclosure is taken from the golf application as many of the same elements will be integrated into the baseball application. Other elements are unique to the baseball-related application Description and examples of the invention The invention encompasses an automated and computerized system for the identification and calling of a baseball "ball" or "strike". In the invention, a real-time system will detect one or multiple objects (both balls and players) that are relevant in the game of baseball and will make accurate decisions even if the umpire is not present physically. The invention uses a visual detection system coupled with a trained AI system, or in other scenarios may also employ Doppler radar inputs. A combination of cameras and intelligent computing systems are employed to track and identify the location of a baseball at a specific point in time, in relation to the environment and to elements within that environment, specifically in relation to the body and anatomy or one or more players, particularly the batter.

In baseball, the strike zone is the volume of space through which a pitch must pass in order to be called a strike even if the batter does not swing. The strike zone is defined as the volume of space above home plate and between the batter's knees and the midpoint of their torso. Whether a pitch passes through the zone is decided by an umpire, who is generally positioned behind the catcher. Strikes are desirable for the pitcher and the fielding team, as three strikes result in a strikeout of that batter. A pitch that misses the strike zone is called a ball if the batter doesn't swing. Balls are desirable for the batter and the batting team, as four balls allow the batter to take a "walk" to first base as a base on balls.

The invention encompasses a system using two or more cameras in functional communication with a computer programmed with software designed to run an ML algorithm that monitors the camera feeds and determines whether the pitch resulted in or will result in a 'strike' or a 'no-strike'. To determine whether the pitch was a 'strike', the algorithm checks whether the ball passed through a virtual three-dimensional zone called the 'strike zone', which is the volume of space above home plate and between the batter's knees and the midpoint of their torso. The strike zone is defined, programed into the software and continuously monitored. The position and speed (vector) of the ball is also continuously monitored.

Since a pitch often results in high-velocity ball, the cameras would conventionally require expensive high frame-refresh rates to capture the exact moment the ball passes through the spatial plane encompassing the 'strike zone'. The present invention uses AI and 'simple' integral calculous to predict the future relative position of the ball relative to the strike zone. We may use cameras with a lower frame rate with an ML-based ball tracking algorithm with which the ball's trajectory is tracked and identified. A vector is produced having speed and direction. The ball trajectory is then extrapolated to determine the ball's location and predict future location with high accuracy while transiting the aforementioned spatial plane. Based on this calculation, the algorithm determines whether the pitch will result in (or has resulted in) a 'strike' or a 'ball'. Unlike present cameras that employ a high frame-refresh-rate, the cameras of the invention have a lower frame-refresh rate, but compensate using an ML-based ball tracking algorithm to identify the ball's trajectory and therefore predict the ball's future location (the strike zone) at a specific location and/or point in time.

When tracking the object (ball) we may take various consecutive live measurements to produce a number of vector plots (having both speed and direction), and then perform integral (and/or differential) calculus to determine the ball's displacement (i.e. the change in its position) and therefore predict its position at a specific time and/or at a specific location. In a generalized way, we can use the simple expression $$\int_0^{10} v(t)dt.$$

The cameras used may have a refresh rate of between 30 frames per second (fps) (like a regular webcam) and 300 fps. The normal frame rate of webcams is generally about 30 frames/second. A meaningful range be for a high frame-refresh rate camera would be, for example 120-300 FPS. Any suitable camera may be used.

A minimum of two cameras is required to perform the method of the invention and check if the ball went through the strike zone.

In one optional embodiment, the tracking system may be activated upon receiving a pitch trigger from hit detection engine. The system visually detects that a player has thrown the ball (a ball was in the hand of the pitcher, the ball leaves the hand of the pitcher, the ball travels in the direction of the home plate with a certain accuracy (pre-defined), and initiates a pitch trigger) flagging that a particular event happened in the software.

In its simplest embodiment, only two cameras need to be present: once behind the catcher (camera 2) and one camera on the right or left hand side of the batter (camera 3 and/or 4). See FIG. 7a. The side on which the camera is placed may be related to the batter being either right or left handed, so will generally be on the right hand side (camera 3) for right handed batters. Even in this configuration, the AI system will be able to track and determine the strike zone for a left handed batter. The more training that is done for the system, the more accurate the calculation will be.

Figure 7A:
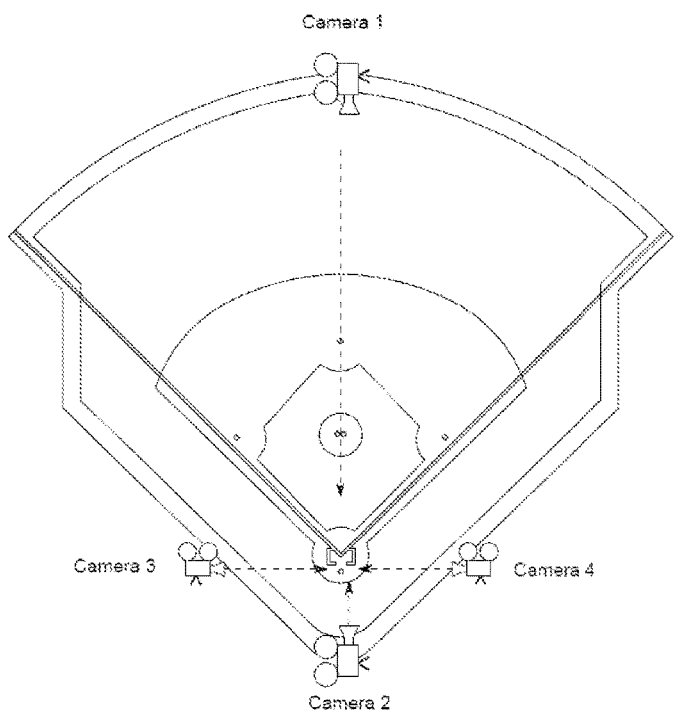
FIG. 7a shows the proposed layout of the camera system.

In a typical embodiment, for greatest accuracy, three cameras are used. We generally use camera 2, camera 3 and camera 4 in combination (FIG. 7a). Camera 1 may be used to record the action, but is not part of the detection and image processing system.

Note that camera 1 is not needed in most embodiments and does not have any role in the detection and tracking process and does not feed information to the computer or AI system. But is generally used for presentation and recording purposes only. In alternative embodiments it may be used in a similar way to one or more other cameras.

Generally, the ball's color is not used explicitly as an input in the ML-based decision-making algorithm, although it may be in certain embodiments. In cricket, for example, different ball colors have been experimented with and different colors may be used to differentiate a ball from the background. I.e., if the batters clothes are white and the ball is white, it may be advantageous to use a red ball. However, in general, the color of the target ball is not a feature of the invention.

Visual target acquisition. The invention uses cameras for capturing Baseball game visuals. It does not use any other types of remote sensors in the field to collect data, such as GPS or RFDI tags. Light, size and color may be detected by the cameras, and location, speed and predicted future locations are determined by the software. Gameplay visuals are streamed live from the camera to the computing module for further processing and analysis. Camera selection primarily depends on the field view of the lens. Most IP Cameras support a field of view of around 120°. Our system is developed so as to support different types of cameras. The selection of them primarily depends on the use case.

ML pre-deployment particulars. The pre-deployment particulars of the system refer to the elements and tasks involved in developing the system before it is deployed as a product. The major pre-deployment tasks of the ML component of the system are specified below:

Data collection. Highly accurate detection and tracking of balls, baseball bats, baseball gloves, and players (anatomical points of players) from the video feed is necessary for error-free scoring during the game. This work employs ML algorithms to perform ball and player detection and tracking tasks. The accuracy of an ML-based software component depends on the quality and quantity of the dataset upon which the algorithm was trained. As such, the invention necessitates the collection of a reliable dataset for training the ML algorithms employed.

FIG. 1 (Dataset Curation) depicts the process of building and curating the dataset used for training the ML models. We have collected images of the game and the images of balls and baseball games from public datasets on the internet. This collection of data is the unfiltered raw data. The next step is to remove duplicates from the raw data using image-matching algorithms. After this step, the images are filtered based on pre-set guidelines. The guidelines are to exclude irrelevant images such as blurry images, occluded images, noisy images, etc. that could potentially degrade the model performance. After the image filtering, a quality inspection was carried out to ensure that the guidelines were being adhered to.

Once the images are filtered, the next step is to annotate the images. Annotation here refers to generating the coordinates of the bounding boxes that envelop the balls, baseball bats, baseball gloves, and humans in the collected images. Using this information the ML models are trained to detect and track the required classes.

Some of the images from the public datasets are already annotated. For the manually collected custom dataset and the public datasets with missing annotations, the annotations were done de-novo, by hand. Another set of guidelines was laid out for ensuring the quality of annotations. Once the annotations were completed, and the dataset was built, it was split into a training set, validation set, and testing set for use in the training, validation, and testing phases respectively. After the dataset was built, a class imbalance check was carried out. A class imbalance may result in a poorly performing ML model after its training. To solve this, if a class imbalance is detected, more data samples from the class that causes the imbalance are collected, or the surplus data from the leading class is dropped to bring the data to a balance.

Model training. Machine learning algorithms are used to generate an output from a given input based on the patterns in data. These patterns in the data are learned by the algorithm based on the data it was given to it during training. Any ML algorithm requires three main components a) Data, b) Model, c) Objective (Error) function. A model is a file that has variables that get adjusted over iterations of training on a given data. Model training is the process in which data is passed through the model over several iterations till the model is able to predict an output with minimal deviance from the expected output or objective function score that goes below an empirical threshold on a set of data elements that it has not seen before. The ML model inference is a computationally intensive exercise and is constrained by hardware limitations and, in turn, the runtime on the deployed device. As such, before fully training and deploying the model, it is ensured that the model meets the complexity and runtime constraints. Thus, the first step is to bring the model complexity to a reasonable limit so that it can smoothly be deployed on the targeted device.

Once the model had been reduced to the desired complexity and met the runtime constraints, we were able to train the model on the training dataset built earlier.

Model evaluation. During deployment of the model, the model state that gives the best predictions is used. But while training the model, it does not necessarily give the best output in the last iteration due to issues like overfitting, model collapse, etc. Apart from this, ML models have various hyper-parameters, such as the number of iterations, the number of images in a batch of training, etc., that are set empirically. A single set of hyper-parameters may not give the best model, and tuning across different hyper-parameter values may be required. In order to address these requirements and extract the best model out of the training, various metrics are used to evaluate the prediction quality of a model. The model training is done in several iterations over the dataset until the model converges to its optimal state. After each training iteration, the model is evaluated on the validation dataset. During the model evaluation (or validation), we feed the model with a new set of data that it has not seen during the training. The outputs of the model are then compared with the expected outputs to obtain metrics like mean average precision (mAP). By tracking these metrics over the course of model training epochs, we can determine whether the model is approaching its optimal state or if it is performing poorly.

Figure 2:
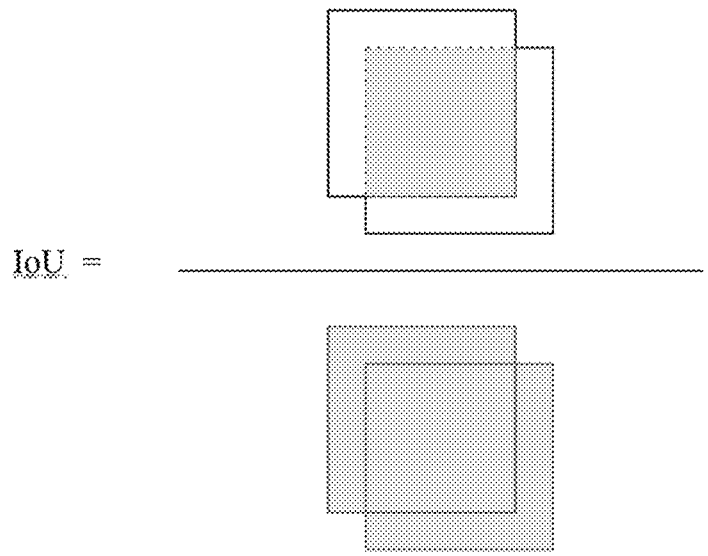
FIG. 2 is a schematic showing how Intersection Over Union is calculated.

The metrics that are used for these models vary from task to task. The proposed work mainly includes two tasks—object detection and classification. The standard evaluation metrics used for object detection include Intersection Over Union (IoU) and mAP, and for classification its precision, recall, and area under the Curve (AUC). The IoU metric in object detection evaluates the degree of overlap between the ground (gt) truth and prediction(PD). The ground truth and the prediction can be of any shape (rectangular box, circle, or even irregular shape) in our case, it's a rectangular box. FIG. 2 shows how IoU is calculated. IoU score calculation is the ratio of area overlap to the area of union. See FIG. 2.

IoU ranges between 0 and 1 where 0 shows no overlap and 1 means perfect overlap. IoU is useful through thresholding, that is, we need a threshold ($\alpha$, say) and using this threshold we can decide if a detection is correct or not. For IoU threshold at α, True Positive(TP) is a detection for which IoU (gt,pd)≥α and False Positive is a detection for which IoU (gt,pd)<α. False Negative is a ground-truth missed together with gt for which IoU (gt,pd)<α.

Precision (Pr) is the ability of a model to identify only relevant objects and is calculated as the percentage of correct positive predictions. Recall (Rc) is the ability of a model to find all relevant cases (all ground-truth bounding boxes). It is the percentage of correct positive predictions among all given ground truths.

$$P = \frac{TP}{TP+FP}, R = \frac{TP}{TP+FN}$$

Average precision(AP)@α is Area Under the Precision-Recall Curve(AUC-PR) evaluated at α IoU threshold. Mean average precision (mAP) is the average of AP values over all classes(objects that are to be detected).

Model optimization a. Model Pruning and Quantization

Pruning and Quantization are techniques to compress model size for deployment, allowing inference speed up and energy saving without significant accuracy losses.

Pruning is a technique which focuses on eliminating some of the model weights(trainable variables) to reduce the model size and decrease inference requirements. Pruning has been shown to achieve significant efficiency improvements while minimizing the drop in model performance (prediction quality). Model pruning is recommended for cloud endpoints, deploying models on edge devices, or mobile inference (among others).

Model quantization is another performance optimization technique that allows speeding up inference and decreasing memory requirements by performing computations and storing tensors at lower bit widths (such as INT8 or FLOAT16) than floating-point precision. This is particularly beneficial during model deployment.

Quantization Aware Training (QAT) mimics the effects of quantization during training: The computations are carried-out in floating-point precision but the subsequent quantization effect is taken into account. The weights and activations are quantized into lower precision only for inference, when training is completed.

Quantization is useful when it is required to serve large models on machines with limited memory, or when there's a need to switch between models and reducing the input-output (I/O) time is important.

b. Tensor RT and TensorFlow Lite (TF-Lite)

TensorRT and TF-Lite are SDKs provided by NVIDIA and Tensorflow to improve the deep learning inference speed. TensorRT is highly optimized to run on NVIDIA GPUs, and TF-Lite is a framework that provides a set of tools that enables on-device machine learning on mobile, embedded, and edge devices. TF-Lite and Tensorrt both support optimization techniques like pruning and quantization. The proposed work converts the trained object detection and classification models into tensor RT for deploying it on-premise with NVIDIA Jetson Board. It is converted to TF-Lite to run inference on mobile devices.

Using the above components and methods, the software is used to perform various functions to track the ball and player. A general explanation is set out below.

1. Input Feed

The first step is to capture the live feed of the playground using the deployed camera system. The Camera system employed is an IP camera array. In the IP camera-based system, multiple cameras are to be mounted on a pole to obtain the side and top profile of the playing field. The visuals are directly streamed to the computing device using the internet protocol.

2. Video Decoder

The IP camera array systems stream the visuals to the computing device in an encoded format. The encoding is usually done to compress the raw video and audio data so that they can be sent over the network connection at a much lower bandwidth than otherwise. Thus, the encoded video signals are decoded and uncompressed at the receiving end of the communication channel to restore the original visual information.

3. Image Fusion

Since we are using multiple IP cameras, an image fusion algorithm is employed to merge the visuals of multiple cameras into a single video frame. The image fusion algorithm would enable the seamless visualization and tracking of the classes of interest in transit across the field of view of different cameras.

4. ROI Extraction

Once the complete view of the playfield is obtained, the next step is to eliminate the unwanted region in the video frame. The elimination of irrelevant regions would reduce the overall image size and hence could be processed faster by the ML models.

5. Image Restoration

In some situations, extracted images are corrupted due to weather conditions such as sunny, rainy, cloudy, etc. This may result in under-exposure or overexposed video frames. To address such issues, an adaptive contrast enhancement technique, where the system checks for the exposure level in an image and, based on the output, equalizes the image exposure to the required value.

6. Object Detection & Tracking

Object tracking is a process of predicting the positions of objects throughout frames using their spatial and temporal features. In our project, we have implemented a tracking algorithm named DeepSORT along with YOLOv5. DeepSORT is a computer vision tracking algorithm for tracking objects while assigning an ID (identification number) to each object. DeepSORT is an extension of the SORT (Simple Online Real Time Tracking) algorithm. DeepSORT presents deep learning into the SORT algorithm by including an appearance descriptor to decrease identity switches, Subsequently making tracking more effective. YOLOv5 is a family of compound-scaled object detection models trained on the COCO dataset and incorporates simple functionality for Test Time Augmentation (TTA), model assembling, hyperparameter evolution, and export to ONNX, CoreML, and TFLite or the like.

Detection is the first step in the tracking module. Object detection is a computer technology related to computer vision and image processing. Every object class has its own special features for identifying its respective classes. For example, baseballs are round in shape, whereas baseball bats are conical in shape. The object detection algorithm in general predicts the position and type of the objects of interest in an image. In our scenario, the objects of interest are the baseballs, baseball bats, person, and baseball gloves. An object detector, YOLOv5, detects the objects in the frame to be tracked. Ball detection refers to the identification of each unique ball from the camera visual. The system intends to simulate the outcome of human intelligence in identifying the balls in the playfield. Person detection is a variant of object detection used to detect a primary class "person" in images or video frames. As such, a computer assisted system is necessary to identify objects of interest across multiple frames of the video. We propose to employ an object detection algorithm to detect these objects from the video. Additionally, an object tracking algorithm will be employed to identify the baseballs as they transit across the frames.

The ML algorithm that performs the object detection is deployed in one of the computing devices in the system. This device continually monitors the camera visuals and runs the ML object detection algorithm on the video frames. The phenomenon of taking outputs from a trained ML model is called model inference. The inference outputs of an object detection algorithm are the bounding box coordinates and the class number of the detected objects. A bounding box is the rectangular box with the minimum area that envelopes an object of interest. The class ID is a unique identifier that denotes the class of an object. Using the object detection algorithm we detect four classes that are baseball, baseball glove, baseball bat, person.

Tracking is getting the initial set of detections, assigning unique IDs, and tracking them throughout frames of the video feed while maintaining the assigned IDs. Trackers are also used in sports like ball tracking or player tracking. Here we employ an object-tracking algorithm that continuously monitors the coordinates of the objects of interest during the gameplay. Leveraging this, we can display the required outcome, here it is to check whether it's a strike or not at any point. For fast and accurate object tracking, we employ a lightweight deep learning-based algorithm called Deep-SORT Also, by employing tracking we identify the detected objects with a history of motion during the gameplay. If somehow a stationary object in the playfield was falsely detected as an object of interest by the system, in the proposed method, a falsely detected baseball can be dismissed as a false detection since it lacks a motion history. This will suppress the false detections contributed by objects like dry leaves, dirt, litter etc. that may mimic the appearance of an actual baseball from the camera perspective.

An embodiment of the tracking system. In one embodiment, the tracking system is composed of a plurality of cameras in functional communication with a machine-learning (ML) Engine programmed into a microcomputer. The ball tracking is performed using an ML/AI algorithm using model inference, and a backbone algorithm using a lightweight deep learning-based algorithm. The microcomputer may be local or connected to the internet. Video processing is usually done locally avoiding sending large video content to a cloud-based processor. The system may run continually, or may be set to detect that a pitcher has thrown the ball, and initiate a pitch trigger, flagging that a particular event happened in the software and readying the software to receive data about strike-zone and ball position and speed. The backbone algorithm maps the ball in flight. The same or a separate backbone algorithm maps the strike-zone. The backbone algorithm reads video frames from the camera streams (camera 2 and cameras 3 and 4), feeds data to the AI algorithm and post-processes these outputs, fusing the feeds of the cameras (camera 2 and cameras 3 and 4) into a single virtual 3-D image locating the present and predicted position of the ball relative to the strike-zone. The backbone algorithm may also performs zone mapping and syncing the data with one or more outputs or displays. The AI algorithm performs the specific objectives of: (i) Ball detection, wherein the algorithm receives video input and assigns the ball coordinates and speed as output, and (ii) Ball tracking and extrapolation to determine real-time location and to predict ultimate location at a specific time or withing or near a specific location (the strike-zone); this detection and tracking may be performed with or without a grid, and in some embodiments may employ an N×N grid on image, bounding box and confidence prediction class probability map; also, this AI based object detection algorithm may include a color and/or size discrimination algorithm, and (iii) Strike-zone virtual imaging in real-time by mapping the strike zone in real time using coordinates on the batter and on the home plate, and (iv) integrating the strike-zone information with the ball tracking, location and prediction information to determine if a pitch is a strike, a ball or a hit.

7. Pose Detection

Figure 3:
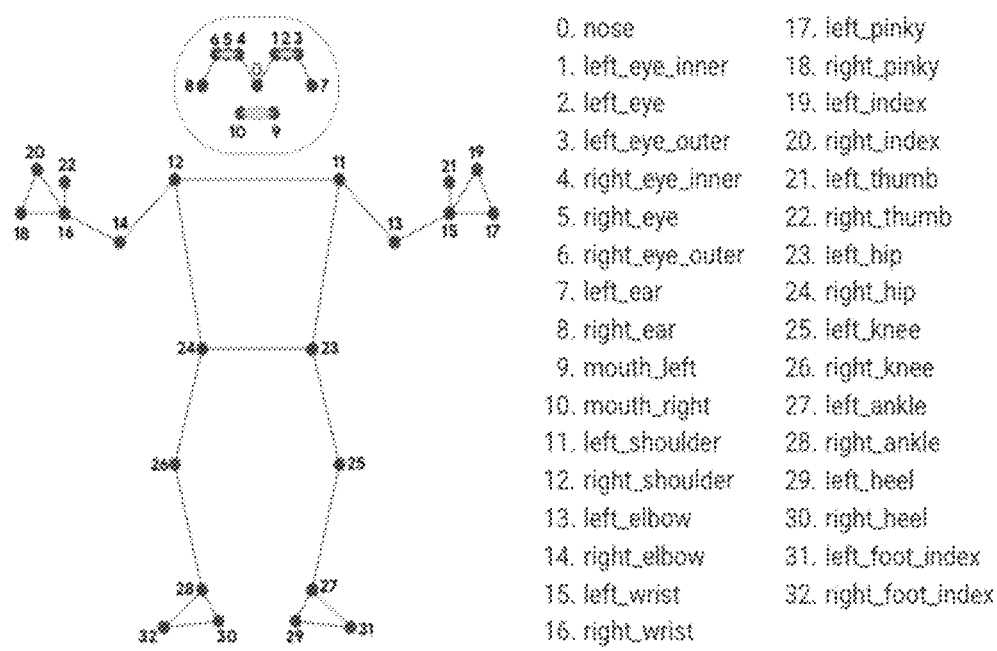
FIG. 3 shows the landmarks corresponding to different body parts for the pose detection system.

Pose detection and estimation is a computer vision procedure to track the movements of an individual or an object in real time from a continuous video image. This can be used as a rule for finding the location of key points for the given objects. These key points can be used to compare different movements and stances and draw insights. Pose estimation is effectively utilized in the field of robotics, gaming, and technology. Human Pose Estimation is a way of distinguishing and classifying the joints and other key features of the human body. Generally, the user's face must be visible in order to distinguish a posture. Pose detection works best when the subject's whole body is present within the frame. It can recognize a partial body posture too. A pose describes the body's position at one moment in time with a set of skeletal landmark points. The landmarks correspond to different body parts, such as the shoulders and hips. Pose detection produces a full-body 33-point skeletal coordinates that incorporates facial points (ears, eyes, mouth, and nose) and points on the hands and feet. FIG. 3 shows the landmarks looking through the camera at the user. So the output will be a mirror image, i.e., the left side of the image will be the user's right side.

There are several models which can perform pose estimation. We use the Blaze Pose GHUM 3 D, a lightweight convolutional neural network architecture for detecting human pose and extracting key points. Our approach is based on a statistical 3 D human body model called GHUM, we have developed it using a large corpus of human shapes and motions. To obtain 3 D human body pose ground truth, we fitted the GHUM model to our existing 2 D pose dataset and extended it with real-world 3 D key point coordinates in metric space. Our model can be effortlessly executed through a supportive library, well known as a media pipe. It is an open-source, cross-platform framework for building multimodal machine-learning pipelines. The pose detection algorithm which we developed depends on COCO topology consisting of 17 key points, and our detector, Blaze Pose, can anticipate the x,y, and z coordinates of 33 human key points, including torso, arms, leg, and face. It comprises two machine learning models: a Detector and an Estimator. The Detector cuts out the human region from the image which we give as an input, whereas the Estimator takes a 256×256 resolution image of the detected individual as input and outputs the key points. It predicts two additional virtual key points that firmly describe the human body center, rotation, and scale as a circle. We predict the midpoint of a person's hips, the radius of a circle circumscribing the whole person, and the incline angle of the line connecting the shoulder and hip midpoints. This model is available in two versions, Blaze Pose Lite and Blaze Pose Fully, to make a balance between speed and accuracy.

In baseball, the strike zone plays a critical part in each pitch. The strike zone is the volume of space above the home plate and between the batter's knees and the midpoint of their torso. The baseball strike zone is a three-dimensional pentagonal prism that portrays the space through which a baseball pitcher must pitch a baseball for the pitch to count as a strike when the baseball hitter does not swing. Pitches that pass through the strike zone count as strikes, three of which strike out the hitter. The exact measurements of the strike zone usually vary according to the baseball player since it is usually characterized in terms of the batter's physical characteristics, such as height. Locating and defining the strike zone is carried out using the Pose Detection method named Blaze Pose. Once the batter position is predicted from the frame, a crop of the batter is passed to the pose detection algorithm that predicts the pose coordinates of the batter. This includes the position coordinates like left/right knee coordinates, left/right hip coordinates etc. These pose predictions are then used to estimate the height of the strike zone and the batter type (left/right-handed). See FIG. 3 that shows Pose Landmarks predicted by the pose detection algorithm (https://google.github.io/mediapipe/solutions/pose.html).

Methodology of the invention

This method of the invention assumes the field of view of the camera (camera 2, the 'primary camera') includes the pitcher, batter, and catcher. According to the batter type (left-handed or right-handed), the side camera's (4 or 5) position will be decided. The primary camera (2) may be positioned above and within view of the home plate, such as in the top-back position of the home plate or the catcher. In one embodiment, the primary camera may be positioned semi-submerged in a sort of pill box enclosure, below the pitcher's mound. This will still be "above and within view of the home plate". I don't want to intro at this point as we hope we have gotten the nod on our current claims. However this may be something that we want to add after this patent is issued.

Figure 4:
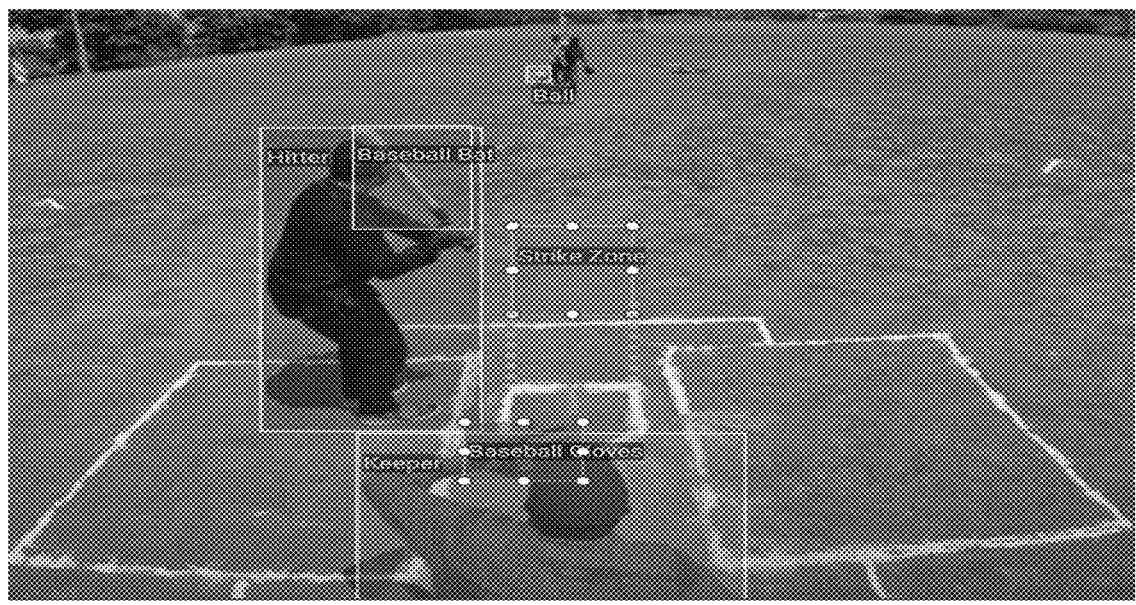
FIG. 4 shows strike Zone identification using top-back camera.
Figure 5:
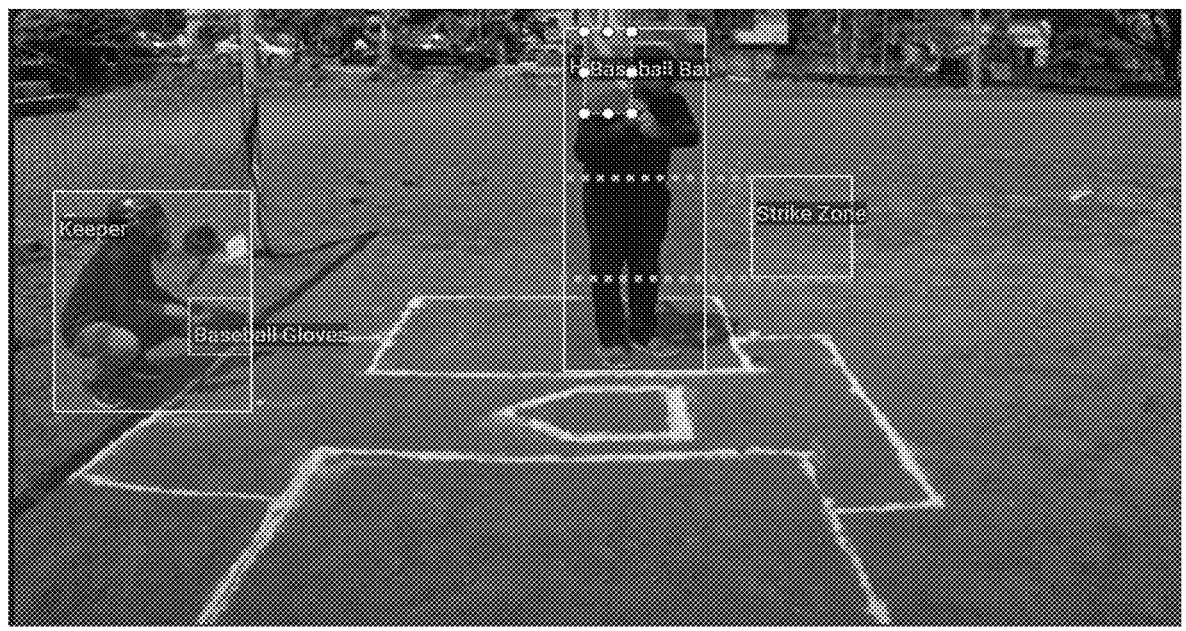
FIG. 5 shows strike Zone identification using left/right camera.
Figure 6:
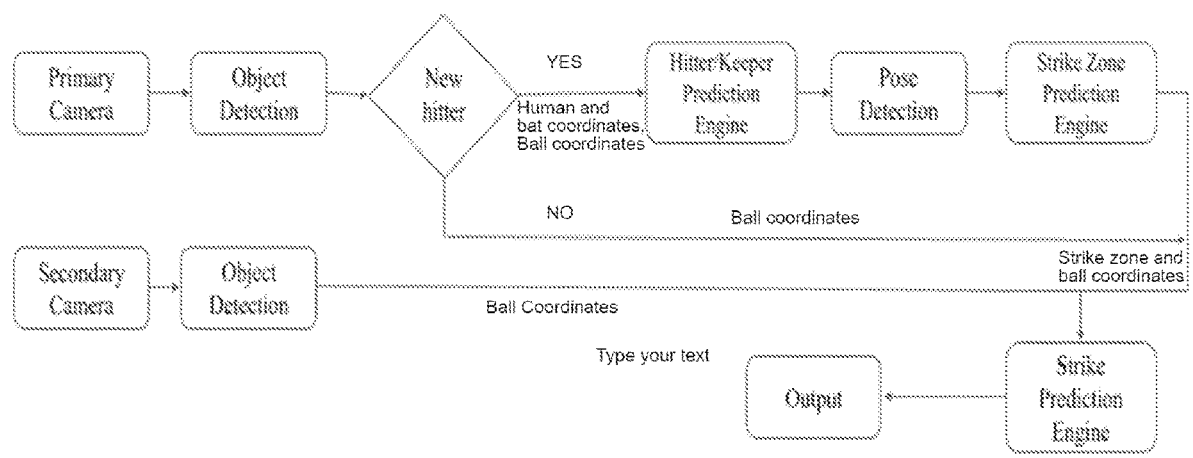
FIG. 6 is a flow diagram of the baseball gamification system. The "Primary camera" is camera 2, and the "Secondary camera" is camera 3 or 4. This flow diagram only shows input from one secondary camera, but two cameras may be used and the input of both integrated into the AI system of the strike prediction engine.
Figure 7B:
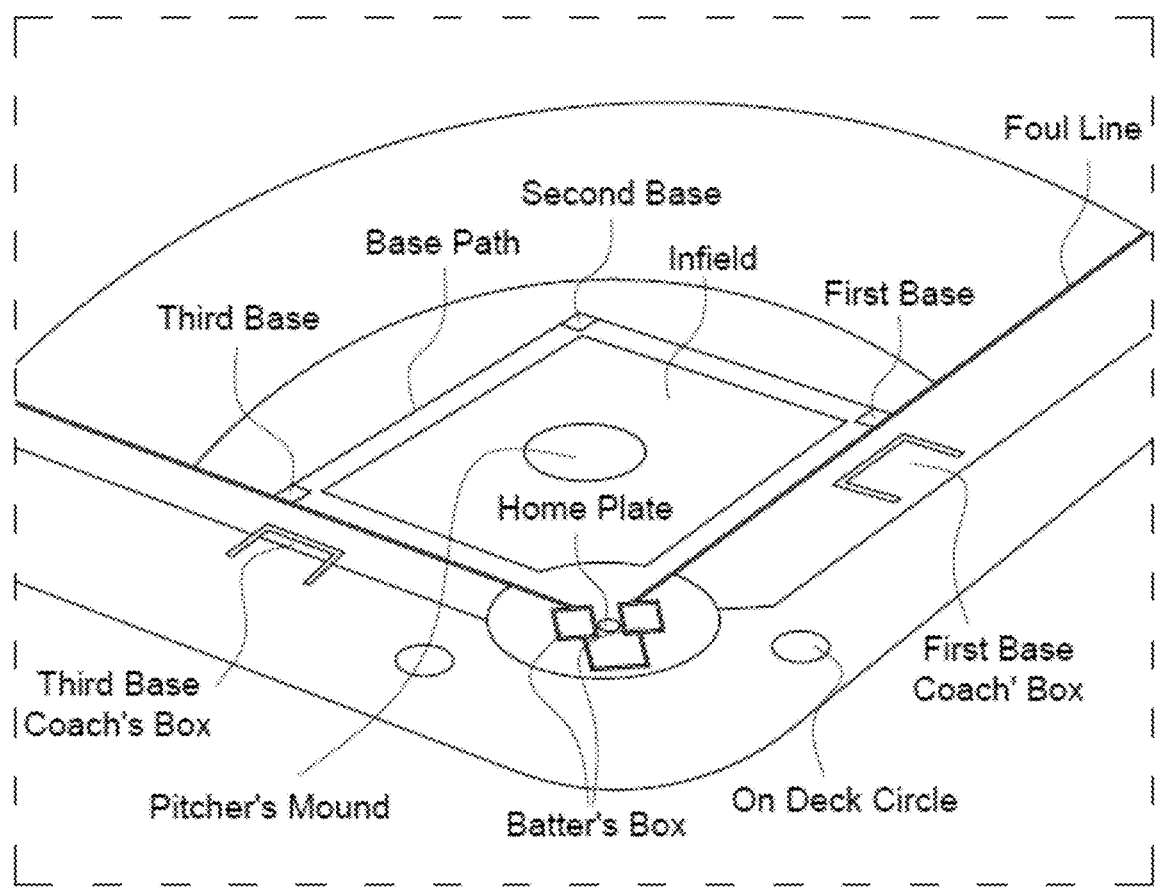
FIG. 7b shows the layout and specific parts of a typical baseball field (diamond).
Figures 8, 9:
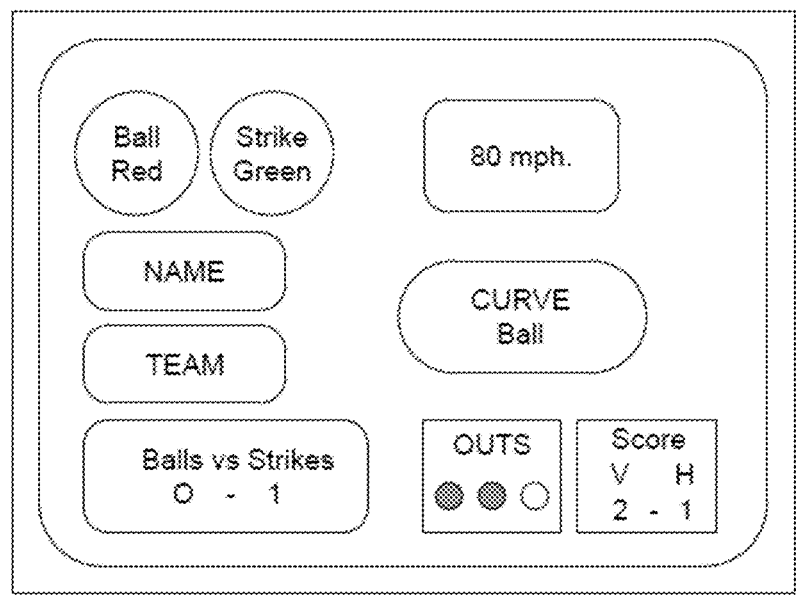
FIG. 8 shows a schematic showing an exemplary handheld screen showing batter name, whether the last pitch resulted in a ball (red) or a strike (green), ball speed, pitch-type (curve), cumulative balls vs. strikes, outs and score.
FIG. 9 shows a schematic diagram showing 5×5, 2-dimensional grid from which 3-D 'home plate space' is extrapolated. S=strike zone. O=Outside strike zone.

The strike zone's three-dimensional width and height are calculated (as shown in FIG. 4 and FIG. 5) using the primary camera (camera 2) and/or right/left camera (3 and 4), respectively. The frames extracted from the live video feed of the primary camera (2) are fed to an AI-based object detection algorithm that extracts the coordinate positions of the baseball, humans, baseball glove, and baseball bat if present in the frame. FIG. 4 shows strike Zone identification using top-back camera. FIG. 5 shows strike Zone identification using left/right camera. FIG. 6 shows a flow diagram of the steps of the invention where the "Primary camera" is camera 2, and the "Secondary camera" is camera 3 or 4 and the input of the cameras is fed into the AI system of the strike prediction engine. FIG. 7 shows the proposed layout of the camera system for baseball strike detection.

In order to detect batsmen, the baseball bat and human coordinates are used to estimate the batter coordinate in the frame based on the overlap area between each of these coordinates. Once the batter position is predicted from the frame, a crop of the batter is passed (copied) to an AI-based pose detection algorithm that predicts the pose coordinates of the batter. This includes the position coordinates like left/right knee coordinates, left/right hip coordinates etc. These pose predictions are then used to estimate the height of the strike zone and the batter type (left/right-handed). Similarly, based on the area of overlap of the baseball glove and human position coordinates in the frame, the coordinate position of the catcher is determined and extracted. Additionally, the sitting (squatting) posture of the keeper is also extracted to assert the identity of the keeper. The position of the strike zone is then centered based on the catcher's position, and its width is assigned on par with the rules. For each batsman, this process of extraction of batter and catcher information is done only in the initial frames so that the strike zone may be estimated for a particular batter. See FIG. 6.

Once the strike zone is determined for a batter, the ball is detected and tracked based on the AI detection algorithm whose area of overlap with the strike zone is calculated. If the ball coordinates have an overlap above a particular threshold, the ball trajectory is assigned to be in the strike zone.

Once the ball is in the strike zone, the system continuously checks whether the ball has come in contact with the baseball bat. Based on the ball coordinate detections from the primary (2) and secondary (3 and/or 4) camera(s), it checks whether the ball has crossed the batter. From the inferences, the system predicts whether the pitch is strike or a ball or a hit. The above-mentioned process is repeated until a new hitter comes onto the plate.

FIG. 6 shows a flow diagram of the baseball gamification system, showing the processing steps using two cameras. The "Primary camera" is camera 2, and the "Secondary camera(s)" is/are camera(s) 3 and/or 4. This flow diagram only shows input from one secondary camera, but two cameras may be used and the input of both integrated into the AI system.

Although this disclosure uses visual detection systems coupled with a trained AI system, other scenarios may also employ Doppler radar inputs to feed information into the AI system. For example a Doppler radar could be poisoned with camera 2 to determine the speed at which the ball is travelling at any point in time. This speed information is combined with the position information from the visual inputs to help calculate the path of the ball and therefore predict the exact coordinates the ball will be at when passing through or past the strike zone at a position closest to the strike zone at any given time.

Camera Positions for Baseball Strike Detection

The invention uses a stereo-vision-based system that employs two or more cameras for baseball strike detection. FIG. 7 shows the proposed layout of the camera system for baseball strike detection.

In this disclosure we discuss positions of cameras. When we refer to a position 'behind' home base (home plate), we are referring to a position that would be behind the batter when the batter is on home base and facing the pitcher. When we refer to a camera in a position 'behind and above the catcher' we mean a position that is behind home base (home plate), as already described, and elevated about the ground by at least 6 ft., up to any appropriate height suitable for the cameras function. In general, the primary camera (camera 2) is positioned above and within view of the home plate, for example at a position behind and above the catcher. In other embodiments it may be in front of the catcher or home plate. It will generally be raised up on a pole, about 6 ft or more (say between 6 ft and 12 ft above the ground) and it will be relatively close to the back of the catcher, for example within 20 ft (or in other examples within 10 ft. or within 20 ft, 30 ft, 40 ft, 50 ft or 60 ft of the catcher. Being close the catcher allows a desirable perspective of the batter. In other embodiments it may be further away, and not within the field at all. Theoretically there is not necessary limit to the position, so long as the camera can fulfil its function of viewing the batter. When we say that the secondary camera is positioned to the left (or right) of the home base (home plate), we are referring to a position that is to the left (arbitrarily) of the home base, approximately along a line orthogonal to a line drawn between the home plate and second base. Exemplary positions are reasonably accurately shown in FIG. 7a.

The strike zone is defined as a virtual rectangular polygon which is the volume of space above home plate and between the batter's knees and the midpoint of their torso. The strike zone is defined, programed into the software and continuously monitored. See FIGS. 4 and 5.

The primary camera (camera 2) is positioned at a position behind and above the catcher and facing towards the outfield area, for instance on a pole erected within 20 ft of the catcher or for example near the on-deck-circle. The field of view of the primary camera includes the batter and catcher and usually also the pitcher. To take into account both right handed and left handed batters, it may be preferable to position cameras to the right and to the left hand side of the pitcher. However this variation is optional, and the system will work with two cameras only (cameras 2 and 3 or 4). The frames extracted from the live video feed of the cameras are fed to an AI-based object detection algorithm that extracts the coordinate positions of the baseball, humans, baseball glove, and baseball bat if present in the frame. See FIG. 7.

The side-view camera(s) (cameras 3 and/or 4) feeds are used to continually track the pose of the batter in relation to the home plate, and therefore continually define the strike zone. The method of the invention is able to adjust for the differing heights of batters to allow for adjustable strike zones. Multiple (two or more) video feeds from one or both sides of the batter and from the primary camera (2) are used to track the location of the ball. Using the tracking system, we are able to identify whether the ball trajectory is from the pitcher (bowler) to the batter (batsman) or whether it is directed from the batter to the pitcher or in some other direction. By analyzing the ball trajectory, we can determine whether the ball was hit or if it was missed by the batter. Also, based on the key points of the batter's pose, such as the knees, hip, ankle etc., and the relative position of the ball while it crosses the home plate, we can determine whether or not the pitch resulted in a valid hit, a strike or a ball.

The system may be set up as follows: A camera (camera 2) is positioned outside or inside the diamond facing in the direction of batter as shown in FIG. 7. In one embodiment the camera is elevated on a pole and placed near the 'on deck circle' and directed toward the home plate, as shown in FIG. 7. In another embodiment the camera is placed outside the diamond at a longer distance where the camera is focused approximately at the in-field so that it covers the pitching mound and the catcher's position. A wide angle camera (3 and/or 4) is positioned on the left and/or right depending on the batter's hand position (left / right-handed batter). FIG. 7 shows the proposed layout of the camera system for baseball strike detection.

Additional elements in alternative embodiments

The following embodiments may not be part of the tracking system but have been disclosed by the inventor and are thus retained in this description. In alternative embodiments additional cameras may be used for recording and visualizing the game (not for tracking, such as camera 1). In one embodiment, a camera is partially buried in the pitching mound and inserted in a protective pill box that allows the camera to have a wide view but not impact play. A second camera on the first base dugout and perhaps a camera on the third base dugout will allow us to splice the video together to determine balls and strikes based on where a thrown baseball crosses the plate. The cameras can also be placed on a tripod behind the pitcher on the field or on the outfield fence or on a high platform to get a longer view of the entry point of where the ball crosses the plate. We envision the technology will be used for live games, training and practice sessions. It will be able to accommodate baseball, softball, cricket, and any other games that require an umpire to determine the results of a "pitch". The camera or cameras will record results of where the ball crosses at zone. The information processed through a server in the scorer's box or a processor that is built into the cameras. Once the data is processed it is sent to a display device such as a hand-held device or computer monitor to keep track of the results. We envision the results of the ball or strike will also immediately be displayed behind the batter on the backstop to show strikes or a ball on a scoreboard in real time players and fans to see. The invention provides a very affordable and accurate system to reduce the cost of and require human discretion to allow balls and strikes to be called to play games.

Embodiments and Examples

Although the present disclosure relates to baseball, the invention may be used with and applied to any number of ball games all of which inherently encompass problems of calling a good or a foul ball depending on the location of the ball at a certain time in relation to a fixed or a variable/moving point. The invention may be applied to and used with, for example, games of baseball, cricket, rounders, football, tennis, basketball, badminton, volleyball, hurling, Jai alai, squash, makahiki etc.

EXAMPLE #1

2-camera system. The system may be implemented with no more than two cameras. Camera 2 is positioned raised up on a pole behind and above the home plate, and facing towards the outfield area with a field of view of the batter and catcher and the pitcher. One other camera (camera 3) is positioned to the left of the home plate. Video feed from the cameras is fed to an AI-based object detection algorithm that extracts the coordinate positions of the baseball, humans, baseball mitt, and baseball bat if present in the frame. Video feeds are used to continually track the pose of the batter in relation to the home plate, and therefore continually define the strike zone. The video feed from camera 2 determines the strike zone, and the feed from camera 3 tracks the ball, and the data from both these feeds is provided to the Strike Prediction Engine running a trained AI system, data is transformed and analyzed and an output is produced defining the pitch as a strike, a ball or a hit.

EXAMPLE #2

3-camera system. The system may be implemented with no more than three cameras. In addition to Example 1, camera 4 is positioned to the right of the home plate. The feed from cameras 3 and 4 is fed into the Strike Prediction Engine for transformation and analysis.

EXAMPLE #3

Multi-camera system. The system may be implemented with more than three cameras wherein four or more cameras simultaneously provide live video feed to the Strike Prediction Engine.

EXAMPLE #4

Doppler radar. A Doppler radar transmitter/receiver is poisoned close to camera 2 to determine the speed at which the ball is travelling at any point in time. This speed data is fed to the Strike Prediction Engine and combined with the position information from the visual inputs to help calculate the path of the ball and therefore predict the exact coordinates the ball will be at when passing through or past the strike zone at a position closest to the strike zone at any given time.

EXAMPLE #5

Visual markers. To aid visual detection and assist easy disambiguation, balls may be marked in some way such as by color, infrared or ultraviolet or fluorescent markers that can be tracked by using an optical tracking device alone.

EXAMPLE #6

To save computing resources, the tracking system may be activated upon receiving a pitch trigger from hit detection engine. The system visually detects that a player has thrown the ball (a ball was in the hand of the pitcher, the ball leaves the hand of the pitcher, the ball travels in the direction of the home plate with a certain accuracy (pre-defined), and initiates a pitch trigger) flagging that a particular event happened in the software.

EXAMPLE #7

In one specific embodiment, the method uses a 3-camera array, as described in Example 2, and a specific embodiment of the tracking system. In this embodiment, the tracking system is composed of a plurality of cameras in functional communication with a machine-learning (ML) Engine programmed into a microcomputer. The ball tracking is performed using an ML/AI algorithm using model inference, and a backbone algorithm using a lightweight deep learning-based algorithm programmed into a local computer, not connected to the internet. The system may run continually, or may be set to start data collection on detection of a pitch trigger (discussed previously) and readying the software to receive data about strike-zone and ball position and speed.

The backbone algorithm maps the ball in flight. The same or a separate backbone algorithm maps the strike-zone. Strike-zone virtual imaging is done in real-time by mapping the strike zone in real time using coordinates on the batter and on the home plate. (In other embodiments this may be performed by the AI algorithm). The backbone algorithm reads video frames from the camera streams (camera 2 and cameras 3 and 4), feeds data to the AI algorithm and post-processes these outputs, fusing the feeds of the cameras (camera 2 and cameras 3 and 4) into a single virtual 3-D image locating the present and/or the predicted position of the ball relative to the strike-zone. The backbone algorithm may also performs zone mapping and syncing the data with one or more outputs or displays. The AI algorithm performs at least three of the specific objectives of: (i) Ball detection, wherein the algorithm receives video input and assigns the ball coordinates and speed as output, and (ii) Ball tracking and extrapolation to determine real-time location and to predict ultimate location at a specific time or within or near a specific location (the strike-zone); this detection and tracking may be performed with or without a grid, and in some embodiments may employ an N×N grid on image, bounding box and confidence prediction class probability map; also, this AI based object detection algorithm may include a color and/or size discrimination algorithm, and (iii) Strike-zone virtual imaging in real-time by mapping the strike zone in real time using coordinates on the batter and on the home plate [Note that this is usually performed by the backbone algorithm], and (iv) integrating the strike-zone information with the ball tracking, location and prediction information to determine if a pitch is a strike, a ball or a hit.

The invention is further defined, but not limited by the claims and figures in this disclosure.

Seven exemplary embodiments (in claim format) are as follows. These seven embodiments were set out and allowed in the parent application (US application Ser. No. 18/104,113 filed 21 Jan. 2023).

1. A computerized system for automatic classification of a 'strike' or a 'ball' or a 'hit' in reference to a baseball that is pitched by a pitcher in a game of baseball on a baseball field having a home plate, a pitcher's mound, a first base, a second base, and a third base, the system comprising:

at least two cameras wherein a primary camera is positioned behind and above the position of the home plate, and a side camera is positioned to the left of home plate, wherein each camera captures a continuous video image; wherein the field of view of the primary camera is at least 120° and includes the positions of a batter (while on the home plate) and a catcher and a pitcher, and wherein the field of view of the side camera is at least 120°, and also includes the batter (while on the home plate) and the catcher and the pitcher;

wherein both cameras are in functional communication with and transmit video images to a computer programmed with software running an AI-based object detection algorithm that monitors and analyses the video images comprising at least a Human Pose Estimation engine and a Strike Prediction Engine running a trained AI system, wherein the computer (i) uses Human Pose Estimation to ascribe facial and skeletal coordinates to the batter, (ii) ascribes coordinates to a home plate , a baseball mitt, and a baseball bat, if present in the frame, and (iii) integrates information about the coordinates of the batter and the coordinates of the home plate to define a real-time virtual three-dimensional volume (the strike zone), and further (iv) identifies the ball in motion, continuously collects data about the location and speed of the ball, and provides this data to the Strike Prediction Engine, wherein the data is transformed and analyzed to produce an output defining the pitch as a strike, a ball or a hit.

2. The computerized system of claim 1, further comprising a third camera is positioned to the right of home plate.

3. The computerized system of claim 1, further comprising a Doppler radar system poisoned at the location of camera 2.

4. The computerized system of claim 1, wherein Human Pose Estimation ascribes coordinates to the left and right knee and the left and right hip of the batter.

5. The computerized system of claim 1, wherein said baseball is marked to aid visual detection and assist disambiguation.

6. The computerized system of claim 2 wherein said baseball is marked using a type of marker selected from the group consisting of color, infrared, ultraviolet and fluorescent markers.

7. The computerized system of claim 1 wherein said at least two cameras start data collection on detection of a pitch trigger from hit detection engine.

ADDITIONAL EMBODIMENTS FOR CONTINUATION-IN-PART

In addition to the various embodiments already discussed, the inventors have developed various additional embodiments and inventions as set out below.

Figure 10:
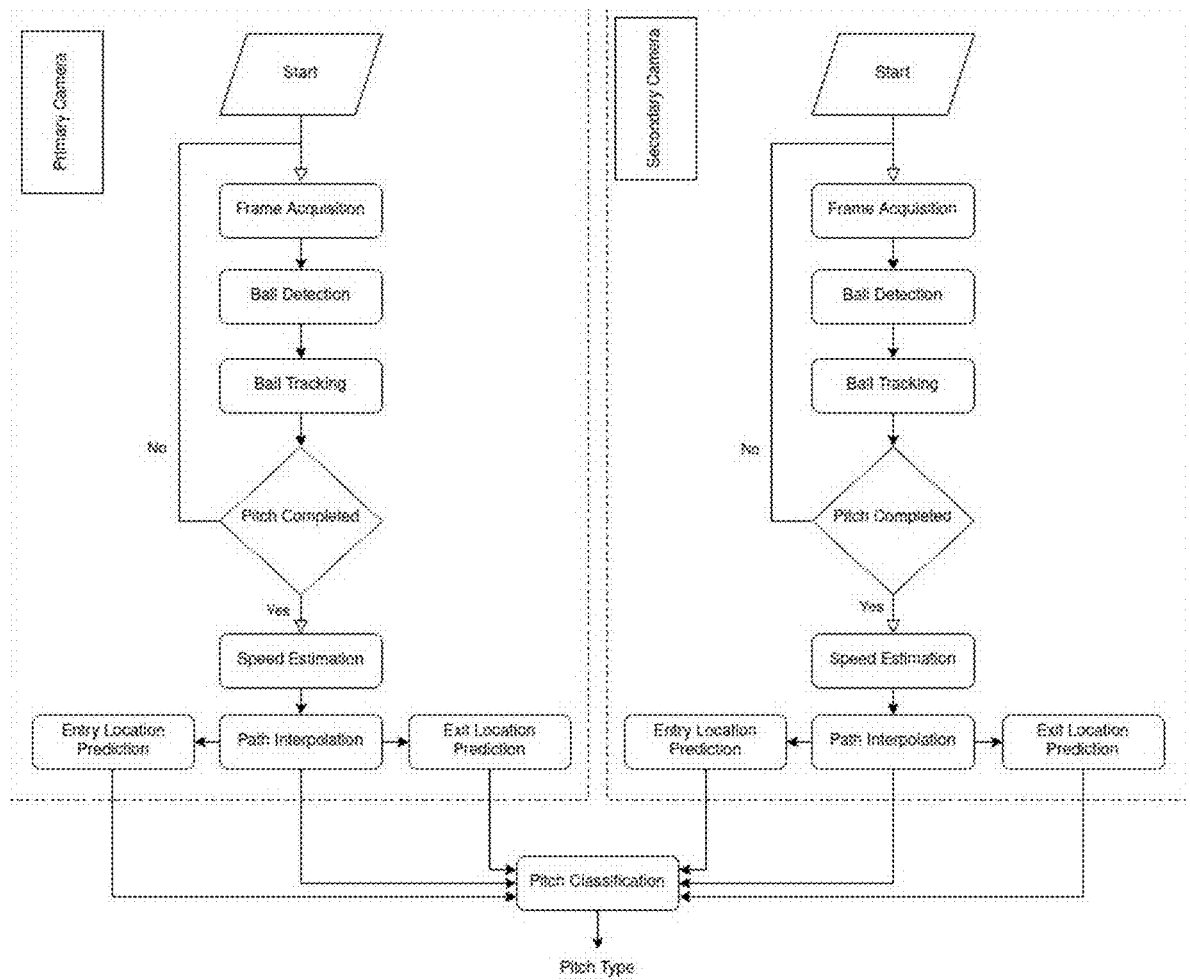
FIG. 10 is a schematic showing the information processing steps performed by a "pitch-type identification system" which comprises a computer running an AI algorithm used to determine pitch-type. Specifically this relies on (1) pre-programmed criteria involving speed of the ball, and drop of height of the ball between entering and exiting the home plate space, and entry and exit locations of the ball entering and exiting the home plate space; and/or (2) a large-dataset-trained AI system, trained on curated data which allows accurate identification of a pitch type; thus the "Pitch Classification" step uses the AI-system to classify the type of pitch. The figure shows how the primary camera tracks the ball (the pitched ball) to completion. If pitch is not completed then the routine reverts back to the start. Path interpolation identifies an predicts both entry an exit locations. The same is done with the secondary camera. All this data is fed into the Pitch Classification box (the AI system) which then identifies the pitch type.
Figure 11:
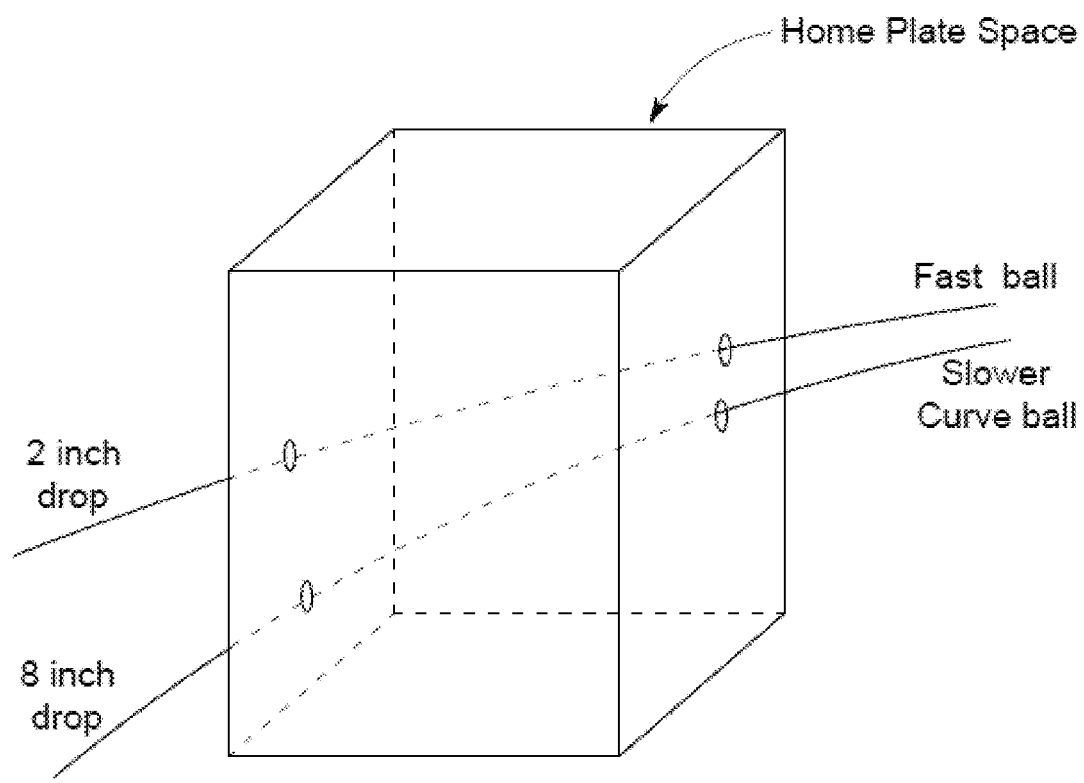
FIG. 11 is a schematic showing the difference between a fast ball and a slow or curve ball passing through the Home Plate Space. In this example, the fast ball drops 2 inches and the slow/curve ball drops 8 inches.

In one new embodiment, the system provides specific spot placement of the ball as it enters and exits "home plate space", which is a 3-D volume above the home plate. This is to say the system calculates, stores, displays and reports the exact momentary location in 3-dimensional space of the ball relevant to a pre-defined geometrical shape defined by the strike-zone and the home plate. The strike-zone, of course, is defined by the position (at an instant in time) and anatomy of the batter. In one exemplary (not limiting) embodiment, the system defines the home plate space as a 3-dimensional shape developed and extrapolated from a 5×5, 2-dimensional grid (25 squares of identical dimensions) set out on the ground, centered around the home plate, looking from a vertical position directly above the home plate. In this embodiment, the 9 most central squares will be defined as 'strikes'. The 16 outside squares outside the plate are of strategic interest as they allow the pitcher throw to a zone that is unreachable but still allows the batter to swing at the ball (causing a strike if missed). This embodiment is adapted for use as a teaching tool allowing evaluation during 'bull pen sessions'. See FIG. 10.

In another new embodiment, the system calculates and displays the speed of the ball at a specific point in time and the type of pitch, such as a 'fast ball', 'curve ball' or 'slider'. In this embodiment we shall refer to different "pitch-types" and refer to the system as a "pitch-type identification system".

This data may be displayed together with the determination of a 'ball' or a 'strike'.

This additional data will be visible to spectators as well as coaches, players, people watching in the stands and following along on a display screen such as a hand-held device, pad or computer screen or large public display.

A certain type of pitch can be defined and identified by the system by how, where and when a ball enters and exits the "home plate space". Typically a fast ball will enter the front of the home plate space and will not drop in height more than 1-2 inches before it exits. A curve ball may enter the home plate space at about shoulder height, and drop down from 6-10 inches, for example, as it exits the back of the home plate space. It may also travel from right to left or left to right depending on the pitch and whether the pitcher is right handed or lefthanded.

A slider might do the same as a curveball but the spin would only cause a drop of 3-5 inches, and the entry point may from way to the outside to way to the left side.

These different pitch types need to be pre-defined by selecting ranges for point of entry and the distance the ball drops when passing the home plate space. The computerized system can be either programmed with strict definitions, and/or may be trained using an iterative AI model. A trained ML/AI system is the preferred embodiment, but may be pre-programmed with specific ranges as baseline limits to define a type of pitch. This in in essence no different from the system the invention uses to define a ball or a strike.

The pitch-type identification system comprises a plurality of cameras in functional communication with a machine-learning (ML) Engine programmed into a microcomputer. The pitch-type identification is performed using an ML/AI algorithm using model inference, and a backbone algorithm using a lightweight deep learning-based algorithm. The microcomputer may be local or connected to the internet. Video processing is done locally to maximize speed. The system may run continually, or may be initiated by a pitch trigger which alerts the system readying the software to receive data about ball position and speed relative to the home plate space. A backbone algorithm maps the ball in flight and the same or a second backbone algorithm maps the home plate space. The backbone algorithm reads video frames from the camera streams, feeds data to the AI algorithm and post-processes these outputs, fusing the feeds of the cameras into a single virtual 3-D image locating the home plate space and also locating and/or predicting the position of the ball relative to the home plate space. The backbone algorithm may also sync collected data with one or more outputs or displays. The AI algorithm performs the specific objectives of: (i) definition and real-time tracking of the home plate space; (ii) ball detection, wherein the algorithm receives video input and assigns the ball coordinates and speed as output, and (iii) ball tracking and extrapolation to determine real-time location relative to the home plate space and/or predicting the entry and exit points of the ball relative to the home plate space. This detection and tracking may be performed, for example, relative to a 3-D shape extrapolated from an N×N (e.g., 5×5) 2-dimensional grid (25 squares of identical dimensions) set out on the ground, centered around the home plate. The system may employ a bounding box and confidence prediction class probability map. Also, this AI based home plate space defining and object detection algorithm may integrate the strike-zone information with home plate space information and the ball speed location and prediction information to determine the pitch type, as well as if a pitch is a strike, a ball.

Other embodiments involve the real time collection and display of data for training purposes. Training frequently employs careful review of a video recording of a player so as to observe technical aspects of play, identify problems, and make improvements. Training video observations may be made during regular play, but also during a plain training session in non-game scenarios, such as in batting cages. The present invention can be adapted so that cameras are placed appropriately for such non-game scenarios.

The system can be installed and used in a plain training locations that do not include a first base, second base and third base or field for that matter. The system may be set up in a "bullpen" situation or training facility which contains a pitching mound and a home plate and our technology would be positioned accordingly . The distinction is that the this would be used in an off field location for training and warm up and not in an official game capacity, for training and practice purposes. In this same setting, the system can be used to digitally record data and video for a "bullpen" session of a pitcher. This data is be recorded and then stored, reported and indexed so that the results can be analyzed by humans and/or AI systems during the session or later by the pitcher, coaches, and scouts and others relevant users and analysis. The bullpen sessions include but are not be limited to batting and pitching practice. The system records and displays ball spin and velocity and any other analytics necessary to analyze and compare a pitcher's performance. The cameras are placed approximately orthogonally to each other, with one to the side of the player and one The AI engine is trained using a database of videos from high-performing players ("ideal players" producing an ideal overall statistic). The videos are parsed and ranked by performance statistics. E.g. for a batter swing you can rank videos by batter average or RBIs. A subject batter is videoed and given a score provided by the mean variation from a number of factors. For example the system can measure relative position of locations of hips, hands, feet, bat and ball. Additionally it can measure the angle of strike of the ball, the angle and direction of the ball leaving the bat, and the speed of the ball leaving the bat surface once struck. Each characteristic can be weighted so that the variation of one large datapoint does not outweigh all others. The AI engine can be used to produce an overall quality score by comparing the test subject's data with that of the ideal.

All the systems of the invention may be applied to other games involving moving objects such as balls, for example cricket, basketball, baseball, football, hockey, soccer, rugby, golf, tennis, badminton, volleyball, pickleball, snooker, pool, curling, bowls, boules etc.

In further embodiments, the system of the invention provides an option to integrate data collection, analysis and display with the systems already provided by various companies such as Game Changer™ that provide streaming services to subscribers. Data can be integrated with score keeping systems and data can be imported into such systems in real time to a score book system. Information can be integrated with existing and new scoreboards to make the speed, balls, strike, velocity, ball speed, pitch type or other useful data flow seamlessly and display on those scoreboards viewed by the spectator, coach or scorekeeper tracking the game. Using such a system the base umpire or an umpire on the field or from a remote location to control a balls and strikes machine and control the officiating of the game in a similar way to a handheld device that allows umpires to manually use a button or wheel to advance balls and strikes and outs.

The new embodiments of the invention include (but are not limited to) those set out below.

A computerized system for automatic identification of various pitch-types of a ball pitched by a pitcher in a game of baseball on a baseball field having a home plate, a pitcher's mound, a first base, a second base, and a third base, the system comprising:

at least two cameras wherein a primary camera is positioned above and within view of the home plate, and a side camera is positioned to the left or right of the home plate, wherein each camera captures a continuous video image; wherein the field of view of the primary camera is at least 120° and includes the positions of a batter (while on the home plate) and a catcher and a pitcher, and wherein the field of view of the side camera is at least 120° , and also includes the batter (while on the home plate) and the catcher and the pitcher;

wherein both cameras are in functional communication with, and transmit video data to a computer programmed with one of more backbone programs and an AI algorithm, receiving data from the backbone program, which is trained to classify a ball into various pitch types using the data provided by the one or more backbone programs, wherein said one or more backbone programs defines and maps the 3-dimensional home plate space in real-time, wherein the home plate space is a 3-dimensional shape extrapolated from an N×N 2-dimensional grid centered on the home plate, and performs object detection, monitors and analyses the video images, and post-processes the video data from the cameras, and feeds it into the AI algorithm, and wherein the one or more backbone programs detects and maps the ball in real-time, and calculates the speed of the ball and calculates and/or predicts the path of travel of the ball relative to the home plate space and predicting the entry and exit points of the ball relative to the home plate space, and produces data containing such information, and feeds said data to the AI algorithm which is trained to classify a ball into various pitch types using the data provided by the one or more backbone programs, and wherein the pitch type data is transmitted from the computer to a screen viewable by a viewer.

In a further embodiment the N×N 2-dimensional grid is a 5×5 grid. In another embodiment the AI algorithm employs a bounding box and confidence prediction class probability map, and may further identify the ball in motion, continuously collects data about the location and speed of the ball, and provides this data to a strike prediction engine, wherein the data is transformed and analyzed to produce an output defining the pitch as a strike, a ball or a hit. A third camera can be used in some embodiments, positioned to the right or left of home plate, and data collection may begin on detection of a pitch trigger from hit detection engine. The system can further include a Doppler radar system poisoned at the location of the primary camera. In some embodiments, the baseball is marked to aid visual detection and assist disambiguation using a type of marker selected from the group consisting of color, infrared, ultraviolet and fluorescent markers. In a further embodiment the pitch type data may be transmitted from the computer to a screen viewable by a viewer and wherein the pitch-type comprises a fast ball, a curve ball and a slider. In a further embodiment the screen is viewable by a viewer and displays information including the speed of the ball and whether the pitch was a strike, a ball or a hit. In a further embodiment the screen viewable by a viewer further provides an option for instant replay and slow-motion video playback.

Another embodiment encompasses a system that identifies both pitch-type and whether a pitch results in a foul ball. For example:

A computerized system for automatic identification of various pitch-types pitched by a pitcher and/or classification of a 'strike' or a 'ball' or a 'hit' in a game of baseball on a baseball field having a home plate, a pitcher's mound, a first base, a second base, and a third base, the system comprising:

at least two cameras wherein a primary camera is positioned above and within view of the home plate, and a side camera is positioned to the left or right of the home plate, wherein each camera captures a continuous video image:

and wherein the field of view of the primary camera is at least 120° and includes the positions of a batter (while on the home plate) and a catcher and a pitcher, and wherein the field of view of the side camera is at least 120°, and also includes the batter (while on the home plate) and the catcher and the pitcher;

wherein both cameras are in functional communication with and transmit video images to a computer programmed with software running an AI-based object detection algorithm that monitors and analyses the video images comprising at least a Human Pose Estimation engine and a Strike Prediction Engine running a trained AI system, wherein the computer (i) uses Human Pose Estimation to ascribe facial and skeletal coordinates to the batter, (ii) ascribes coordinates to a home plate, a baseball mitt, and a baseball bat, if present in the frame, and (iii) integrates information about the coordinates of the batter and the coordinates of the home plate to define a real-time virtual three-dimensional volume (the strike zone), and further (iv) identifies the ball in motion, continuously collects data about the location and speed of the ball, and provides this data to the Strike Prediction Engine, wherein the data is transformed and analyzed to produce an output defining the pitch as a strike, a ball or a hit; and further, wherein the AI system detects and maps the ball in real-time, and calculates the speed of the ball and calculates and/or predicts the path of travel of the ball relative to the home plate space and predicting the entry and exit points of the ball relative to the home plate space, and analyses the data so-produced by the AI-system to classify the pitch-type into at least a fast-ball, a slow-ball and a curve-ball.

In various additional embodiments this computerized system that identifies both pitch-type and whether a pitch results in a foul ball further comprises a third camera is positioned to the right or the left of home plate. The ball may be marked to aid visual detection and assist disambiguation using a type of marker selected from the group consisting of color, infrared, ultraviolet and fluorescent markers.

The backbone program may perform the following steps: frame acquisition, ball detection, ball tracking, determination of whether the pitch has been completed, speed estimation and path interpolation to predict the entry location and the exit location of the ball, and compiles data based on these characteristics, and where the AI algorithm is trained to perform, and does perform pitch classification, and further performs automatic identification of various pitch-types pitched by a pitcher and/or classification of a 'strike' or a 'ball' or a 'hit', using the data provided by the one or more backbone programs.

The above embodiments are not meant to limit the invention, and the claims below set out the intended scope of the invention in light of the specification and the figures.

The invention claimed is:

1. A computerized system for automatic identification of various pitch-types of a ball itched by a pitcher in a game of baseball on a baseball field having a home plate, a pitcher's mound, a first base, a second base, and a third base, the system comprising:

at least two cameras wherein a primary camera is positioned above and within view of the home plate, and a side camera is positioned to the left or right of the home plate, wherein each camera captures a continuous video image; wherein the field of view of the primary camera is at least 120° and includes the positions of a batter (while on the home plate) and a catcher and a pitcher, and wherein the field of view of the side camera is at least 120°, and also includes the batter (while on the home plate) and the catcher and the pitcher;

wherein both cameras are in functional communication with, and transmit video data to a computer programmed with one of more backbone programs and an AI algorithm, receiving data from the backbone program, which is trained to classify a ball into various pitch types using the data provided by the one or more backbone programs, wherein said one or more backbone programs defines and maps the 3-dimensional home plate space in real-time, wherein the home plate space is a 3-dimensional shape extrapolated from an N×N 2-dimensional grid centered on the home plate, and performs object detection, monitors and analyses the video images, and post-processes the video data from the cameras, and feeds it into the AI algorithm, and wherein the one or more backbone programs detects and maps the ball in real-time, and calculates the speed of the ball and calculates and/or predicts the path of travel of the ball relative to the home plate space and predicting the entry and exit points of the ball relative to the home plate space, and produces data containing such information, and feeds said data to the AI algorithm which is trained to classify a ball into various pitch types using the data provided by the one or more backbone programs, and wherein the pitch type data is transmitted from the computer to a screen viewable by a viewer.

2. The system of claim 1 wherein the N×N 2-dimensional grid is a 5×5 grid.

3. The system of claim 1 wherein the one or more backbone programs employs a bounding box and confidence prediction class probability map.

4. The system of claim 1 wherein the one or more backbone programs further identifies the ball in motion, continuously collects data about the location and speed of the ball, and provides this data to a strike prediction engine, wherein the data is transformed and analyzed to produce an output defining the pitch as a strike, a ball or a hit.

5. The system of claim 1, further comprising a third camera is positioned to the right or left of home plate.

6. The system of claim 1, further comprising a Doppler radar system poisoned at the location of the primary camera.

7. The system of claim 1, wherein said baseball is marked to aid visual detection and assist disambiguation using a type of marker selected from the group consisting of color, infrared, ultraviolet and fluorescent markers.

8. The system of claim 1 wherein said at least two cameras start data collection on detection of a pitch trigger from hit detection engine.

9. The system of claim 2 wherein the 9 most central squares will be designated as a strike zone.

10. The system of claim 1 wherein the pitch type data is transmitted from the computer to a screen viewable by a viewer and wherein the pitch-type comprises a fast ball, a curve ball and a slider.

11. The system of claim 1 wherein the screen viewable by a viewer further displays information including the speed of the ball and whether the pitch was a strike, a ball or a hit.

12. The system of claim 1 wherein the screen viewable by a viewer further provides an option for instant replay and slow-motion video playback.

13. The system of claim 1 wherein the pitch type data is transmitted from the computer to a third-party system operated to provide streaming services to subscribers, and may optionally include data selected from the group consisting of: speed of the ball, pitch-type and data about whether the pitch was a strike or a ball.

14. The system of claim 1 wherein the backbone program performs the following steps:
frame acquisition, ball detection, ball tracking, determination of whether the pitch has been completed, speed estimation and path interpolation to predict the entry location and the exit location of the ball, and compiles data based on these characteristics, and where the AI algorithm is trained to perform, and performs pitch classification using the data provided by the one or more backbone programs.

15. The system of claim 1 wherein the primary camera is positioned semi-submerged in an enclosure, close to the pitcher's mound, but still be above and within view of the home plate.

16. A computerized system for automatic identification of various pitch-types pitched by a pitcher and/or classification of a 'strike' or a 'ball' or a 'hit' in a game of baseball on a baseball field having a home plate, a pitcher's mound, a first base, a second base, and a third base, the system comprising:
at least two cameras wherein a primary camera is positioned above and within view of the home plate, and a side camera is positioned to the left or right of the home plate, wherein each camera captures a continuous video image:
and wherein the field of view of the primary camera is at least 120° and includes the positions of a batter (while on the home plate) and a catcher and a pitcher, and wherein the field of view of the side camera is at least 120°, and also includes the batter (while on the home plate) and the catcher and the pitcher;
wherein both cameras are in functional communication with and transmit video images to a computer programmed with software running an AI-based object detection algorithm that monitors and analyses the video images comprising at least a Human Pose Estimation engine and a Strike Prediction Engine running a trained AI system, wherein the computer (i) uses Human Pose Estimation to ascribe facial and skeletal coordinates to the batter, (ii) ascribes coordinates to a home plate, a baseball mitt, and a baseball bat, if present in the frame, and (iii) integrates information about the coordinates of the batter and the coordinates of the home plate to define a real-time virtual three-dimensional volume (the strike zone), and further
(iv) identifies the ball in motion, continuously collects data about the location and speed of the ball, and provides this data to the Strike Prediction Engine,
wherein the data is transformed and analyzed to produce an output defining the pitch as a strike, a ball or a hit; and further,
wherein the AI system detects and maps the ball in real-time, and calculates the speed of the ball and calculates and/or predicts the path of travel of the ball relative to the home plate space and predicting the entry and exit points of the ball relative to the home plate space, and analyses the data so-produced by the AI-system to classify the pitch-type into at least a fast-ball, a slow-ball and a curve-ball.

17. The computerized system of claim 16, further comprising a third camera is positioned to the right or the left of home plate.

18. The computerized system of claim 16, wherein said baseball is marked to aid visual detection and assist disambiguation using a type of marker selected from the group consisting of color, infrared, ultraviolet and fluorescent markers.

19. The computerized system of claim 16 wherein the backbone program performs the following steps: frame acquisition, ball detection, ball tracking, determination of whether the pitch has been completed, speed estimation and path interpolation to predict the entry location and the exit location of the ball, and compiles data based on these characteristics, and where the AI algorithm is trained to perform, and does perform pitch classification, and further performs automatic identification of various pitch-types pitched by a pitcher and/or classification of a 'strike' or a 'ball' or a 'hit', using the data provided by the one or more backbone programs.

20. The computerized system of claim 16 wherein data produced by the AI-system is transmitted from the computer to a third-party system operated to provide streaming services to subscribers.

* * * * *